United States Patent [19]
Taicher et al.

[11] Patent Number: 6,121,773
[45] Date of Patent: Sep. 19, 2000

[54] LONGITUDINAL NMR WELL LOGGING APPARATUS AND METHOD

[75] Inventors: Gersh (Zvi) Taicher; Arcady Reiderman, both of Houston, Tex.

[73] Assignee: Western Atlas International, Inc., Houston, Tex.

[21] Appl. No.: 08/955,343

[22] Filed: Oct. 21, 1997

Related U.S. Application Data

[63] Continuation-in-part of application No. 08/826,155, Mar. 27, 1997.
[51] Int. Cl.[7] ........................................... G01V 3/01
[52] U.S. Cl. ..................... 324/303; 324/303; 324/314; 324/300; 324/322; 324/318
[58] Field of Search ................................... 324/303, 314, 324/300, 322, 318

*Primary Examiner*—John Barlow
*Assistant Examiner*—Brij B. Shrivastar
*Attorney, Agent, or Firm*—Richard A. Fagin

[57] ABSTRACT

The invention is a nuclear magnetic resonance sensing apparatus comprising a magnet for inducing a static magnetic field in a region containing materials to be analyzed. The static magnetic field is polarized generally along the axis of the apparatus. The static magnetic field has a predetermined maximum longitudinal and maximum radial amplitude gradient. The apparatus includes a transmitter antenna for generating a radio frequency magnetic field in the region for exciting nuclei of the materials to be analyzed by conducting a radio frequency current through the transmitter antenna. The apparatus includes a receiving antenna for detecting a nuclear magnetic resonance signal from the excited nuclei. In a particular embodiment, the transmitter antenna and receiver antenna consist of coil pairs, each coil in a pair separated from the other by 90 degrees, to generate a circularly polarized RF magnetic field and to perform quadrature detection of the NMR signals.

16 Claims, 7 Drawing Sheets

LONGITUDINAL NMR WELL LOGGING APPARATUS AND METHOD

This application is a continuation-in-part of copending application Ser. No. 08/826,155 filed on Mar. 27, 1997.

BACKGROUND OF THE INVENTION

1. Field of the Invention

The invention is related to the field of nuclear magnetic resonance ("NMR") sensing apparatus and measuring techniques. More specifically, the invention is related to NMR well logging apparatus and measuring techniques for sensing within earth formations penetrated by a wellbore. The invention also relates to methods for using NMR measurements to determine properties of the earth formations.

2. Description of the Related Art

The description of this invention and the background of the invention are approached in the context of well logging because well logging is a well known application of NMR measurement techniques. It is to be explicitly understood that the invention is not limited to the field of well logging.

NMR well logging instruments can be used for determining properties of earth formations, including the fractional volume of pore space ("porosity"), the fractional volume of mobile fluid filling the pore spaces of the earth formations and other petrophysical parameters. Methods and measurement techniques for using NMR measurements for determining the fractional volume of pore space, the fractional volume of mobile fluid and other petrophysical parameters are described, for example, in *Spin Echo Magnetic Resonance Logging: Porosity and Free Fluid Index Determination*, M. N. Miller et al, Society of Petroleum Engineers paper no. 20561, Richardson, Tex. (1990) and in, *Field Test of an Experimental Pulsed Nuclear Magnetism Tool*, C. E. Morriss et al, SPWLA Logging Symposium Transactions, paper GGG (1993).

The NMR well logging instrument typically includes a permanent magnet to induce a static magnetic field within the earth formations. The instrument also typically includes at least one transmitting antenna, positioned near the magnet and shaped so that a pulse of radio frequency ("RF") power conducted through the antenna induces an RF magnetic field in the earth formations. The RF magnetic field is generally orthogonal to the static magnetic field.

After at least one RF pulse, voltages are induced in at least one receiving antenna on the logging instrument by precessional rotation of spin axes of hydrogen or other nuclei about the static magnetic field. The receiving antenna is typically connected to a receiver circuit in the instrument which detects and measures the induced voltages.

In a typical NMR experiment a sequence of RF pulses is applied to the transmitting antenna and a sequence of voltages is measured by the receiving antenna (note that some instruments use the same antenna for transmitting and receiving). The magnitude of the detected voltages and the rates at which the detected voltages vary with time are related to petrophysical properties of the earth formation.

One type of NMR well logging apparatus is described, for example, in U.S. Pat. No. 3,597,681 issued to Huckbay et al. The apparatus disclosed in the Huckbay et al '681 patent has several drawbacks, a significant one of which is that the region of unidirectional magnetic field is not homogeneous along the wellbore axis. As a practical matter, well logging instruments typically must be able to move axially through the wellbore while making measurements. During the time needed to make a typical NMR measurement, the sensitive region in the formation generated by the logging instrument will change its position so that the measurement cannot be completed. A particular drawback to the apparatus disclosed in the Huckbay et al '681 patent is that a significant part of the NMR signal originates from within the fluid filling the wellbore.

Another drawback to the apparatus disclosed in the Huckbay et al '681 patent is that the RF antenna is directed to one side of the apparatus and therefore utilizes only a small fraction of the unidirectional magnetic field which is both cylindrical and symmetric. This results in inefficient utilization of the permanent magnet in the instrument.

Another drawback to the apparatus disclosed in the Huckbay et al '681 patent is that the antenna is subject to a high static magnetic field strength and, therefore, can have an unacceptably high amount magnetoacoustic ringing.

A still further drawback to the apparatus disclosed in the Huckbay et al '681 patent is that the RF field drops in magnitude by the third power of the distance from the instrument to the sensitive region since the antenna can be modeled as a equivalent three dimensional magnetic dipole. Such an antenna is coupled to a small part of unidirectional field in its close proximity. This results in an extremely low signal-to-noise ratio.

Another type of NMR well logging apparatus is described in U.S. Pat. No. 4,350,955 issued to Jackson et al. The apparatus disclosed in the Jackson et al '955 patent includes permanent magnets configured to induce a magnetic field in the earth formations which has a toroidal volume of substantially uniform magnetic field strength. A particular drawback to the apparatus disclosed in the Jackson et al '955 patent is that the thickness of the toroidal volume is very small relative to typical rates of axial motion of well logging tools during measurement operations. Well logging tools, in order to be commercially useful, typically must be able to move axially through the wellbore at rates not less than about ten feet per minute. The length of time needed to make a typical NMR spin-echo measurement set can be as long as several seconds. The NMR logging tool is therefore likely to move a substantial distance during a measurement cycle. Measurements made by the apparatus disclosed in the Jackson et al '955 patent are therefore subject to error as the apparatus is moved during logging operations, because the antenna would no longer be positioned so as to be sensitive to the same toroidal volume which was magnetized at the beginning of any measurement cycle.

Another drawback to the apparatus disclosed in the Jackson et al '955 patent is that it does not eliminate any NMR signals originating within the fluid filling the wellbore.

A still further drawback to the apparatus disclosed in the Jackson et al '955 patent is that the toroidally shaped static magnetic field is subject to changes in field strength as the instrument is subjected to changes in ambient temperature and variances in the earth's magnetic field. The antenna in the Jackson et al '955 apparatus is tuned to a single frequency. If the field strength of the static magnetic field in the toroidal volume changes, the antenna may no longer be sensitive to NMR signals originating within the toroidal volume. Using the apparatus in Jackson et al '955, it is impractical to compensate the frequency of the RF magnetic field for changes in the static magnetic field strength within the toroidal volume.

Additional drawbacks to the apparatus disclosed in the Jackson et al '955 patent include: the magnet pole pieces being opposed each other. This results in a significant demagnetizing effect which requires magnet material having a high coercive force. This requirement is in direct opposition to the requirement for strong residual magnetization and high temperature stability of the permanent magnet. Second, the magnet pole pieces are spaced apart and are far away from the toroidal region, which makes the use of the permanent magnet material less efficient. Third, the antenna used in the Jackson '955 apparatus has low efficiency as a result of low electromagnetic coupling between the antenna and the earth formation at the resonant frequency for NMR experimentation. Fourth, the antenna is located in a relatively strong static magnetic field, which stimulates magnetoacoustic ringing in the antenna. Fifth, for an NMR measurement technique which uses a homogeneous static magnetic field, changes in the relative position of the instrument with respect to the earth's magnetic field can cause a significant disturbance to the homogeneity of the toroidal region.

Another type of NMR well logging apparatus is described in U.S. Pat. No. 4,717,876 issued to Masi et al. The apparatus disclosed in the Masi et al '876 patent has improved homogeneity in the toroidal region as compared to the apparatus described in the Jackson et al '955 patent, but has basically the same drawbacks as the Jackson et al '955 apparatus.

Another type of NMR well logging apparatus is described in U.S. Pat. No. 4,629,986 issued to Clow et al. This apparatus provides improved signal-to-noise ratio compared with the apparatus of Jackson et al '955 by including a high magnetic permeability ferrite in the antenna. Increased stability is achieved by performing the NMR measurements in a static magnetic field which includes a field gradient. However, the apparatus disclosed in the Clow et al '986 patent has the following drawbacks: Since the magnetic properties of most permanent magnet materials are temperature dependent, the sensitive region is not stable in shape and magnetic field intensity. The sensitive region is only a couple of inches long in the longitudinal direction, which requires that this tool be practically stationary during an NMR measurement cycle. The magnet pole pieces are substantially spaced apart and are far from the sensitive region, which makes the use of the permanent magnet material inefficient. The antenna is located in a relatively strong magnetic field, which stimulates magnetoacoustic ringing in the antenna. The high magnetic permeability ferrite in the antenna is located in a relatively strong magnetic field, which may saturate the ferrite and reduce its efficiency. Soft ferrite disposed in a static magnetic field is also a strong source of magnetostrictive ringing following an RF pulse through the antenna. In the magnet arrangement of the Clow et al '986 patent, the demagnetizing field is relatively strong, which requires a magnet material having high coercive force. This requirement is opposite to the strong residual magnetization and high temperature stability of the magnetic properties also required of the permanent magnet material. Finally, the static magnetic field in the earth formations at resonance is only about 10 Gauss and rotates 360° in a plane perpendicular to the wellbore axis. For this amplitude of static magnetic field, the earth's magnetic field amplitude of about 0.5 Gauss presents a significant disturbance to the overall field strength.

Another type of NMR well logging apparatus described in U.S. Pat. No. 4,717,878 issued to Taicher et al provides azimuthal resolution with respect to the wellbore axis and reduction of spurious signals from the wellbore fluid. However, the apparatus disclosed in the Taicher et al '878 patent has several drawbacks. Since the magnetic properties of the permanent magnet material used in this apparatus is temperature dependent, the sensitive region does not have a stable in shape or stable magnetic field intensity. The antenna is located within a relatively strong magnetic field, which stimulates magnetoacoustic ringing in the antenna. In the arrangement of the magnet in apparatus disclosed in the Taicher et al '878 patent, the demagnetizing field is very strong, which requires a magnet material having high coercive force. This requirement is directly opposite to the strong residual magnetization and high temperature stability of magnetic properties required of the permanent magnet for a well logging apparatus.

Due to the disadvantages of the foregoing NMR well logging instrument designs, none of them have been used in commercially accepted well logging tools. Commercially accepted well logging instruments include one known as the Magnetic Resonance Imaging Logging Tool (MRIL®— trademark of NUMAR Corporation, Malvern, Pa.) which is described in U.S. Pat. No. 4,710,713 issued to Taicher et al. The apparatus disclosed in the Taicher et al '713 patent includes a generally cylindrical permanent magnet assembly which induces a static magnetic field having substantially uniform magnetic field strength within an annular cylindrical volume in the earth formations. The apparatus disclosed in the Taicher et al '713 patent has several drawbacks, however. First, the antenna induces an RF magnetic field within the earth formations surrounding the tool which decreases in strength as the square of the radial distance from the magnet. Moreover, a significant portion of the RF energy can be lost within the fluid in the wellbore if it is electrically conductive. Because the signal-to-noise ratio of NMR measurements made within a gradient magnetic field is typically related to the strength of the RF magnetic field, the apparatus disclosed in the Taicher et al '713 has very high power requirements, and can have difficulty obtaining measurements having sufficient signal-to-noise ratio at substantial radial distances from the instrument.

Another drawback to the apparatus of the Taicher et al '713 patent is that the optimum design of the magnet and the RF antenna, for purposes of optimizing the signal-to-noise ratio, requires that nuclear magnetic resonance conditions be met at a relatively high frequency. Since the RF energy losses in the electrically conductive fluid in the wellbore are proportional to the square of the frequency, the operation of the Taicher et al '713 patent is restricted to use in relatively low conductivity fluids in the wellbore.

Yet another drawback to the apparatus of the Taicher et al '713 patent is that the antenna is located within a relatively strong static magnetic field which is perpendicular to a direction of RF current flow in the transmitting antenna and, therefore, stimulates magnetoacoustic ringing in the transmitting antenna.

Another NMR logging apparatus, known as the Combinable Magnetic Resonance logging instrument (CMR— trademark of Schlumberger Limited, New York, N.Y.), is described in U.S. Pat. No. 5,055,787 issued to Kleinberg et al. The CMR logging tool includes permanent magnets arranged to induce a magnetic field in the earth formation having substantially zero field gradient within a predetermined sensitive volume. The magnets are arranged in a portion of the tool housing which is typically placed in contact with the wall of the wellbore. The antenna in the CMR tool is positioned in a recess located external to the tool housing, enabling the tool housing to be constructed of high strength material such as steel. A drawback to the CMR tool is that its sensitive volume is only about 0.8 cm away from the tool surface and extends only to about 2.5 cm radially outward from the tool surface. Measurements made by the CMR tool are therefore subject to large error caused by, among other things, roughness in the wall of the wellbore, by deposits of the solid phase of the drilling mud (called "mudcake") onto the wall of the wellbore in any substantial thickness, and by the fluid content of the formation in the invaded zone.

Another drawback to the apparatus disclosed in the Kleinberg et al '787 patent relates to the magnet material. Since the magnet pole pieces are opposed each other, there is a strong demagnetizing effect which requires a permanent magnet material having high coercive force. This requirement is opposite to the strong residual magnetization and high temperature stability of magnetic properties required of the permanent magnet.

Another NMR measurement apparatus which may have application for well logging is disclosed in U.S. Pat. No. 5,572,132 issued to Pulyer et al. This apparatus includes a permanent magnet for inducing a magnetic field polarized along the longitudinal axis of the apparatus, and antenna coils disposed about the exterior of the magnet. The apparatus described in the Pulyer et al '132 patent, as do most prior art NMR well logging instruments, has a common drawback which is explained, for example, in U.S. Pat. No. 5,332,967 issued to Shporer. This drawback is related to a significant phase shift of the NMR signal, which leads to significant distortion of the NMR signal height and may even lead to a complete disappearance of the NMR signal, when the logging apparatus is moving in a direction along a static magnetic field amplitude gradient. In actual well logging practice, the phase shift and signal reduction may be even worse than is suggested by the Shporer '967 patent because the logging speed can be variable, as is understood by those skilled in the art of well logging.

SUMMARY OF THE INVENTION

The invention is a nuclear magnetic resonance well logging apparatus comprising a magnet for inducing a static magnetic field in earth formations surrounding a wellbore penetrating the earth formations to be analyzed. The static magnetic field is polarized generally along the axis of the wellbore. The static magnetic field has a predetermined maximum longitudinal gradient and a predetermined maximum radial amplitude gradient so that signals will not be severely corrupted by movement of the apparatus along and within the wellbore. The maximum longitudinal field gradient is inversely related to the logging speed. The maximum radial gradient is inversely related to the expected maximum speed of lateral motion of the logging instrument. The minimum radial gradient should be enough to overcome effects of the earth's magnetic field. The apparatus includes a transmitter antenna for generating a radio frequency magnetic field for exciting nuclei within the formations to be analyzed by conducting a radio frequency current through the transmitter antenna. The apparatus includes a receiving antenna for detecting a nuclear magnetic resonance signal from the excited nuclei.

In a particular embodiment of the invention, the transmitter antenna and receiver antenna consist of pairs of identical coils rotated 90 degrees with respect to each other. The transmitter coil pair is used to generate a circularly polarized RF magnetic field and the receiver coil pair is used to perform quadrature phase sensitive detection of the NMR signals.

In a specific embodiment of the invention, the transmitter antenna is shorter along the direction of motion of the apparatus than is the static magnetic field's length in a sensitive volume where the NMR signals originate. The receiver antenna is shorter along the direction of motion than the transmitter antenna. These features enable the apparatus to make measurements from fully polarized and fully radio frequency excited nuclei even though the apparatus moves along the wellbore while making measurements.

DESCRIPTION OF THE PREFERRED EMBODIMENT

1. Configuration of the Apparatus

Figure 1:
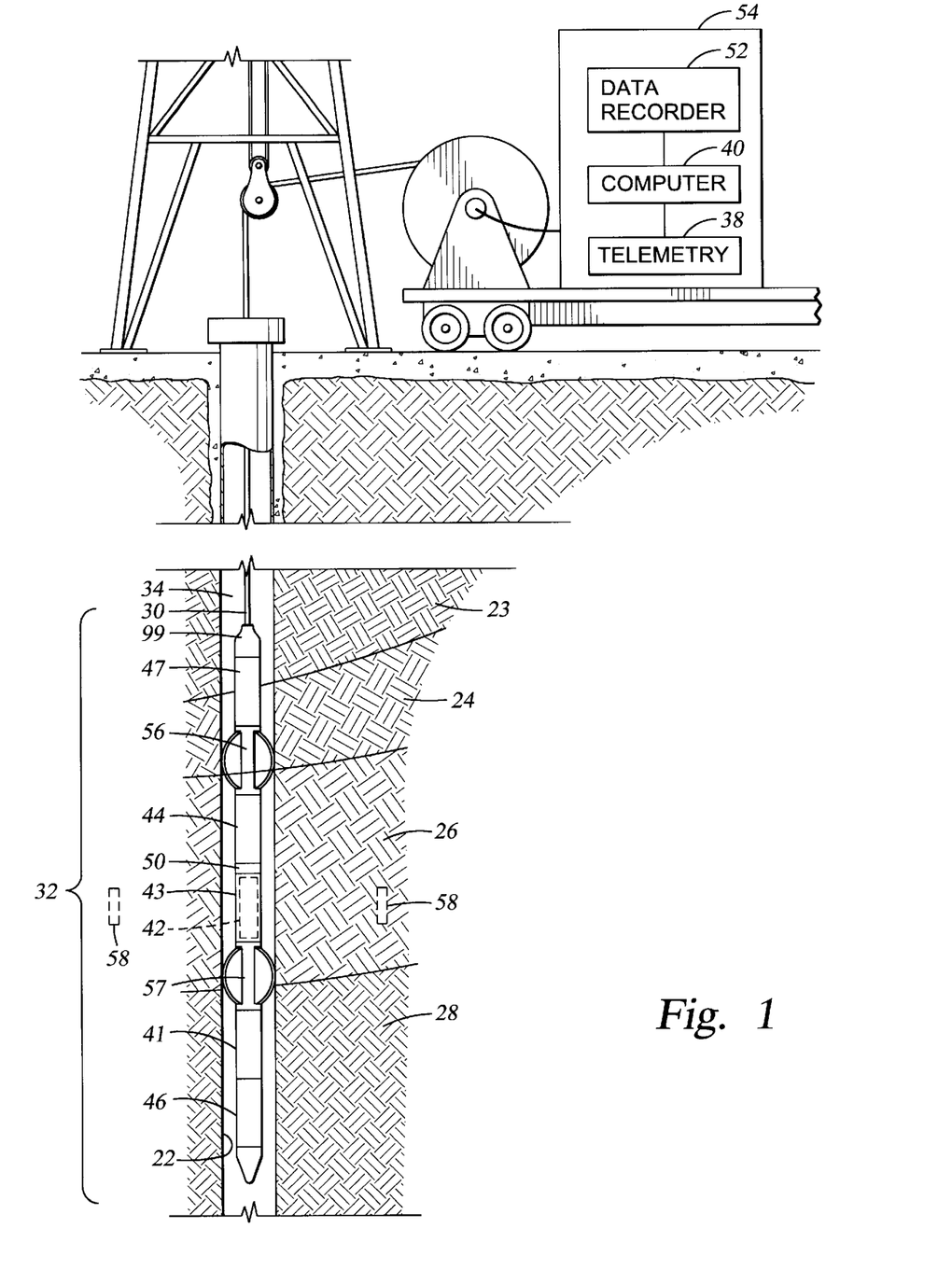
FIG. 1 shows a nuclear magnetic resonance (NMR) well logging apparatus disposed in a wellbore penetrating earth formations.

FIG. 1 shows a well logging apparatus disposed in a wellbore 22 drilled through earth formations 23, 24, 26, 28 in order to make measurements of properties of the earth formations 23, 24, 26, 28. The wellbore 22 in FIG. 1 is typically filled with a liquid suspension 34 known in the art as "drilling mud". A region within the earth formations 26 in which nuclear magnetic resonance ("NMR") is excited by the apparatus, known as a "sensitive volume", is shown generally at 58 and has generally cylindrical shape.

A string of logging tools 32, which can include an NMR apparatus according to the invention, is typically lowered into the wellbore 22 by a means of an armored electrical cable 30. The cable 30 can be spooled and unspooled from a winch or drum 48 of any type known in the art. The tool string 32 can be electrically connected to surface equipment 54 by an insulated electrical conductor (not shown separately in FIG. 1) forming part of the cable 30. The surface equipment 54 can include one part of a telemetry system 38 for communicating control signals and data between the tool string 32 and a computer 40. The computer 40 can also include a data recorder 52 for recording measurements made by the apparatus and transmitted to the surface equipment 54.

An NMR probe 42 according to the invention can be included in the tool string 32. The tool string 32 is preferably centered within the wellbore 22 by means of a top centralizer 56 and a bottom centralizer 57 attached to the tool string 32 at axially spaced apart locations. The centralizers 56, 57 can be of types known in the art such as bowsprings.

Circuitry for operating the NMR probe 42 can be located within an NMR electronics cartridge 44. The circuitry can be connected to the NMR probe 42 through a connector 50. The NMR probe 42 is typically located within a protective housing 43 which is designed to exclude the drilling mud 34 from the interior of the probe 42. The function of the probe 42 will be further explained.

Other well logging sensors (not shown separately for clarity of the illustration in FIG. 1) may form part of the tool string 32. As shown in FIG. 1, one additional logging sensor 47 may be located above the NMR electronics cartridge 44. Other logging sensors, such as shown at 41 and 46 may be located within or below the bottom centralizer 57. The other sensors 41, 46, 47 can be of types familiar to those skilled in the art and can include, but are not limited to, gamma ray detectors, formation bulk density sensors or neutron porosity detectors. Alternatively, parts of the NMR electronics may be located within electronic cartridges which form part of other logging sensors. The locations of the other sensors 41, 46, 47 shown in FIG. 1 are a matter of convenience for the system designer and are not to be construed as a limitation on the invention.

Figure 2:
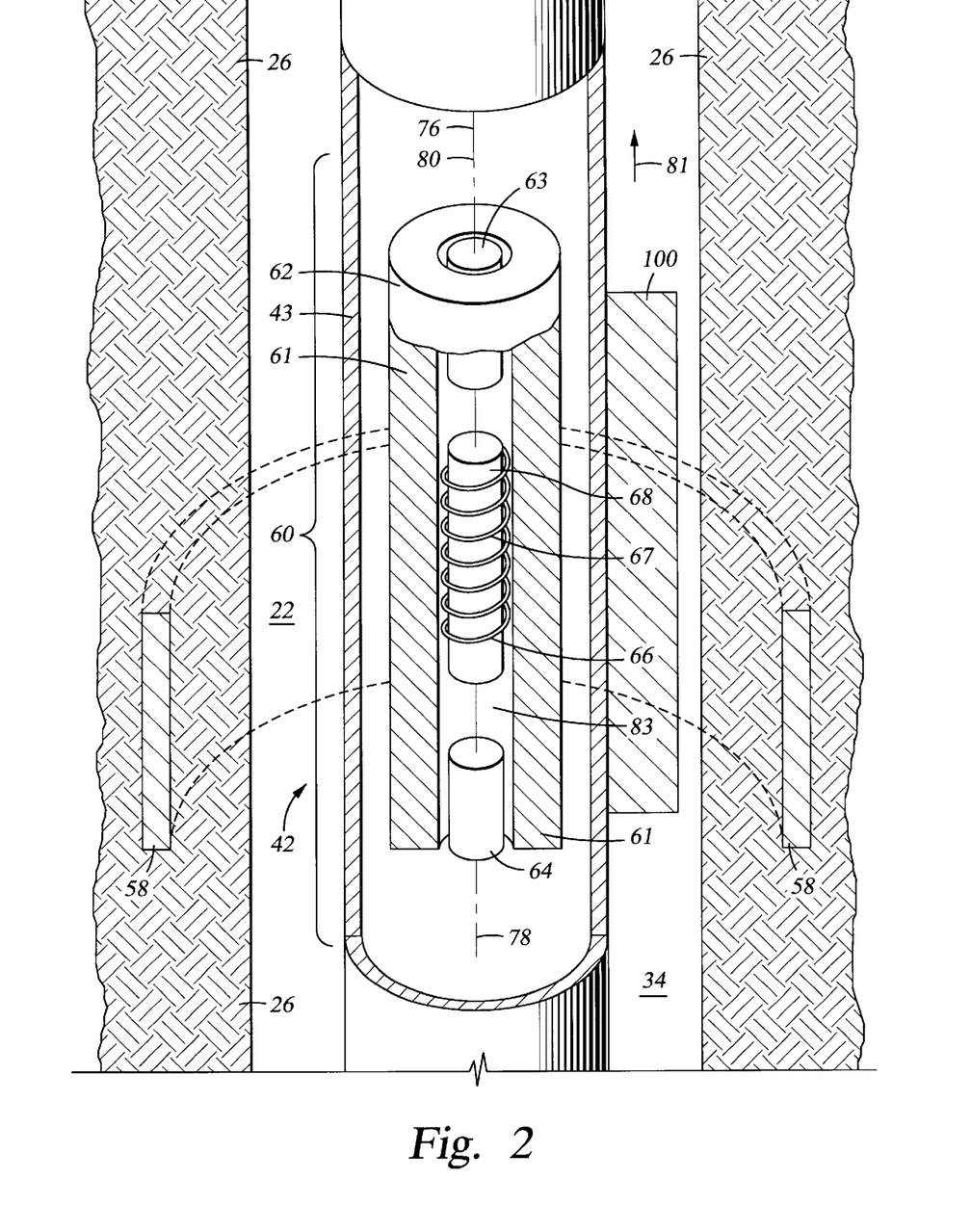
FIG. 2 shows the NMR probe of the apparatus of FIG. 1 in more detail.

FIG. 2 shows the NMR probe 42 in more detail. The NMR probe 42 preferably includes a generally cylindrical, permanent- or electro-magnet assembly 60. The magnet assembly 60 can include at least one permanent magnet 62, which is generally elongated along a magnet axis 80 and preferably has a substantially circular cross section perpendicular to the magnet axis 80. The magnet axis 80 is preferably positioned coaxially with an axis 76 of the wellbore 22. Alternatively, a plurality of permanent magnets may be used to make up the magnet assembly 60. For clarity of the description of the invention, the one or more permanent magnets 62 will be considered together and referred to as the permanent magnet 62, and their common axis 80 and the collocated axis of the wellbore 76 will be jointly identified as a longitudinal axis, shown generally at 78.

The permanent magnet 62 preferably has substantially uniform magnetization along the longitudinal axis 78. The direction of magnetization of the magnet 62, shown at 82 is preferably parallel to the longitudinal axis 78. The permanent magnet's 62 suggested dimensions along the cross-section perpendicular to the magnet axis 80, for generating the preferred shape of a static magnetic field within the sensitive volume 58 will be further explained. An essential feature of the magnet 62 is that the direction of the static magnetic field induced by the magnet 62 within the sensitive volume 58 is substantially parallel to the longitudinal axis 78.

The permanent magnet material from which the permanent magnet 62 is made should generally be radio frequency transparent, so that an antenna used to generate a radio frequency magnetic field can be located on the outer surface of the permanent magnet 62, as will be further explained. One type of magnet material which is transparent to radio frequency energy is a ferrite material such as that sold under the trade name "Spinalor" and manufactured by Ugimag, 405 Elm St., Valparaiso, Ind., or another ferrite material sold under the trade name "Permadure" and manufactured by Philips, 230 Duffy Ave., Nicksville, N.Y. These materials are described only as examples of suitable permanent magnet materials and are not meant to be a limitation on the invention.

The NMR probe 42 also includes a transmitter antenna 67, which can comprise one or more coil windings, as will be further explained in more detail, preferably arranged about the exterior surface of the permanent magnet 62. Radio frequency (RF) alternating current passing through the transmitter antenna generates an RF magnetic field in the earth formations (such as 26 in FIG. 1). The RF magnetic field generated by the current flow in the transmitter antenna 67 has field directions substantially perpendicular to the longitudinal axis 78 within the sensitive volume 58.

The overall length of the transmitter antenna 67 parallel to the longitudinal axis 78 should be substantially longer than its length perpendicular to the longitudinal axis 78, so that the transmitter antenna 67 may be modeled as a two-dimensional magnetic dipole. A two-dimensional magnetic dipole can generate a substantially equal amplitude RF magnetic field within the sensitive volume 58. In addition, the overall length of the transmitter antenna 67 parallel to the longitudinal axis 78 should be substantially shorter in the direction of movement, shown generally by arrow 81, of the probe 42 than the overall length of the permanent magnet 62 along the longitudinal axis 78, as will be further explained.

The NMR probe 42, can also include a receiver antenna 70, which can be formed from one or more coil windings, as will be further explained in more detail, preferably arranged about the exterior surface of the permanent magnet 62. Preferably the receiver antenna 70 has an overall length parallel to the longitudinal axis 78 which is less than the overall length of the transmitter antenna 67 in the direction of movement 81 of the probe 42. As a necessary consequence, the overall length of the receiver antenna 70 parallel to the longitudinal axis 78 should also be substantially shorter in the direction of movement 81 than the length of the permanent magnet 62 along the longitudinal axis 78. A particular property of the receiver antenna 70 arrangement as described herein is that the receiver antenna 70 is substantially orthogonal, and consequently substantially insensitive, to the RF magnetic field generated directly by the transmitter antenna 67. This insensitivity to the direct RF field enables the receiver antenna 70 to provide the apparatus of the invention with a very short "dead time", while the current flowing through the transmitter antenna 67 decays to zero, as will be further explained. Alternatively, the transmitter antenna 67 may be connected to circuits used to apply RF power to the transmitter antenna 67 and thereby be used to generate a circularly polarized RF magnetic field in the sensitive volume 58. A circularly polarized RF magnetic field uses only half the RF power for a given RF field strength as that needed for a linearly polarized RF magnetic field, as will be further explained. Also as will be further explained, the transmitter antenna 67 may be connected to receiver circuits to enable detection of two signals in quadrature with each other which are induced by nuclear magnetic resonance in the sensitive volume 58.

The permanent magnet 62, the transmitter antenna 67 and the receiver antenna 70 are preferably housed within an RF transparent, non-ferromagnetic protective housing 43. Such housings and additional components (not shown) for excluding the drilling mud under high hydrostatic pressure, are familiar to those skilled in the art.

2. Transmitting and Receiving Antenna Arrangement

Figure 3:
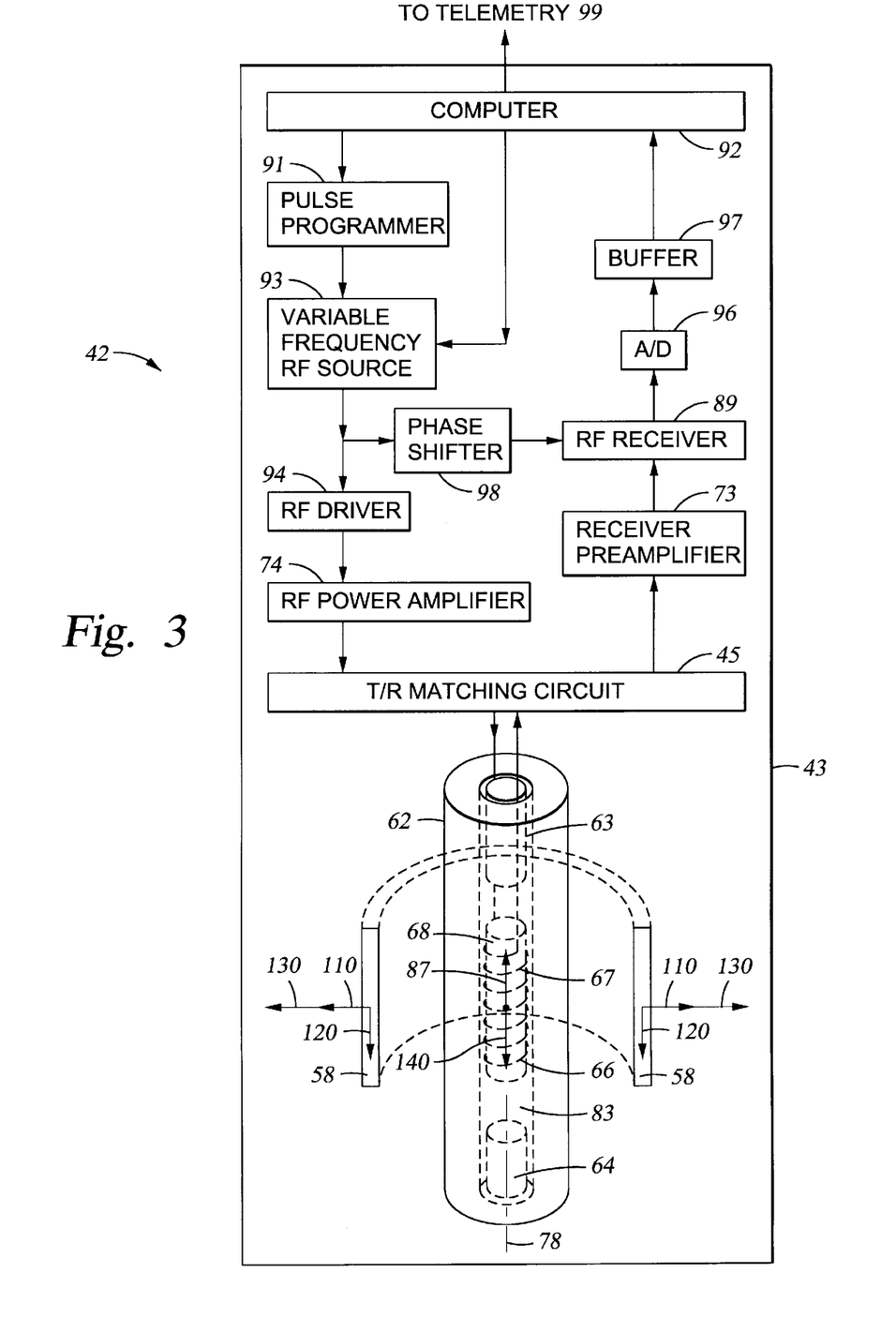
FIG. 3 is a detailed drawing of the transmitter antenna for circular polarized transmission.

FIG. 3 shows an embodiment of the transmitter antenna 67 which improves the performance of the apparatus of the invention. Transmitting an NMR experiment requires a "rotating" or circularly polarized RF magnetic field. One way to transmit this type of field is by applying a linearly polarized field, which can be thought of as two counter-rotating components. Only one component is useful in the NMR experiment and the second one is redundant. This wastes half of the applied RF power. In the well logging environment, the available power is limited and, therefore, its conservation is very important. Alternatively, the RF power can be traded for signal-to-noise improvement.

The embodiment shown in FIG. 3 comprises a transmitter antenna (67 in FIG. 2) which includes a first transmitter coil 85 and a second transmitter coil 86. These coils 85, 86 are substantially identical in design but are rotated 90° with respect each other about the longitudinal axis 78. First coil 85 will induce a magnetic field generally polarized along line 85A when current is passed through it. Similarly, second coil 86 will induce a magnetic field which is generally polarized along line 86A when current is passed through it. Polarization lines 85A and 86A are substantially orthogonal to each other and to the longitudinal axis 78.

There are additional advantages to having two separate RF coils orthogonal to each other where both coils generate an RF magnetic field orthogonal to the static magnetic field in the sensitive region 58. First, separate, orthogonal transmitting and receiving coil may be individually optimized. Second, there is the potential, at any given amount of RF power passed through the coils, of improving the signal-to-noise ratio by a factor of √2. This improvement in the signal-to-noise ratio may be achieved by a technique known in the art of NMR measurement as two-channel quadrature phase-sensitive detection. Detailed design and necessary circuitry for utilization of orthogonal transmitting and two-channel quadrature phase-sensitive receiving by means of a phase-splitting network is described, for example, by C.-N. Chen et al in, *Biomedical Magnetic Resonance Technology*, p. 149, Adam Hilger, (1989).

3. Functional Block Diagram of the Circuits in the Apparatus

Figure 4:
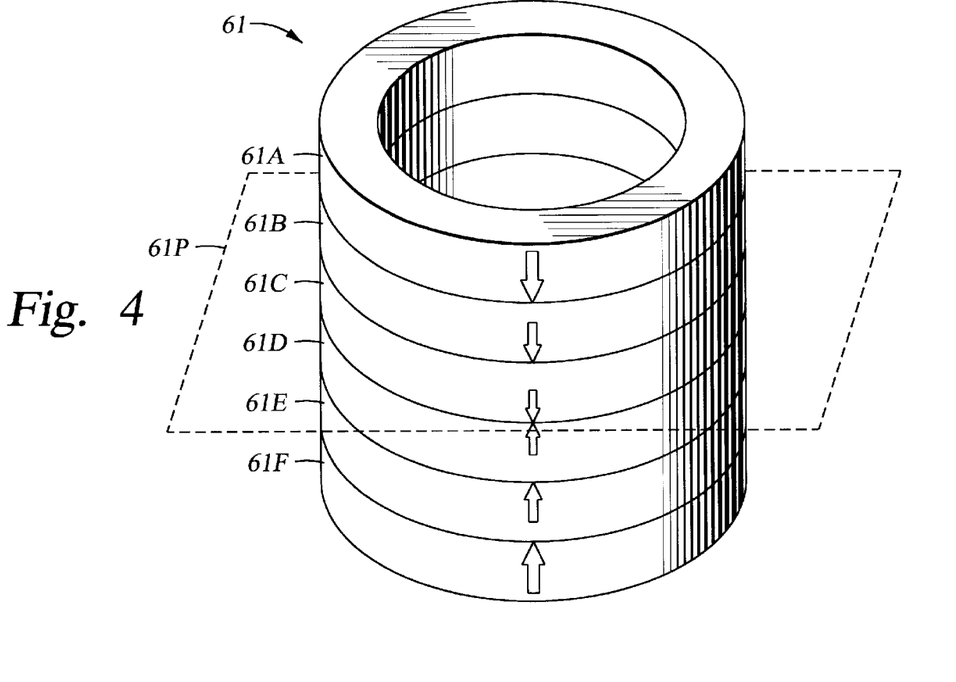
FIG. 4 shows a functional block diagram of the NMR apparatus of the present invention.

FIG. 4 shows, in general form, the NMR probe 42 and a functional block diagram of the NMR well logging apparatus according to the present invention. A transmitter/receiver (T/R) matching circuit 45 can be disposed within the housing 43. The T/R matching circuit 45 typically includes a series of resonance capacitors (not shown separately), a transmitter/receiver switch (not shown separately) and both "to-transmitter" and "to-receiver" matching circuitry. The T/R matching circuit 45 can be coupled both to a radio frequency (RF) power amplifier 74 and to a receiver preamplifier 73. While shown as located inside the housing 43 the T/R matching circuit 45, the RF power amplifier 74 and the receiver preamplifier 73 alternatively may be located outside the housing 43 within the top centralizer (56 in FIG. 1) or within the NMR electronics cartridge (44 in FIG. 1). The locations of the T/R matching circuit 45, the RF power amplifier 74 and the receiver preamplifier 73 are not to be construed as a limitation on the invention.

Part of the control circuitry for the NMR logging apparatus includes a down-hole computer 92, which among other functions provides control signals to a pulse programmer 91. The computer 92 and the pulse programmer 91 may also be located within the top centralizer 56 or in the NMR electronics cartridge 44. The pulse programmer 91 controls the timing and operation of a variable frequency RF signal source 93. An RF driver 94 receives an input from the variable frequency RF source 93 and provides an output to the RF power amplifier 74. The RF power amplifier 74 provides a high power signal to drive the transmitter antenna 67 for generating an RF magnetic field in the sensitive volume (58 in FIG. 1). The RF power amplifier 74 can be electrically connected (typically by the switch in the T/R matching circuit 45) to the transmitting antenna 67 during transmission of RF power pulses.

For the previously described circular polarized mode of transmission the T/R matching circuit 45 can include a two-way splitter (not shown separately) to split the RF power from amplifier 74 into two equal and separate channels. One channel can be directly connected to the first transmitting coil (85 in FIG. 3). The second channel provides power to the second transmitting coil (86 in FIG. 3) through a power 90° phase shifter (not shown separately) which can be located in the T/R matching circuit 45.

During reception of induced NMR signals, the receiver antenna 70 can be electrically connected to the receiver preamplifier 73 by means of the switch in the T/R matching circuit 45. The output of the RF receiver preamplifier 73 is provided to an RF receiver 89. The RF receiver 89 also receives a phase reference input from a phase shifter 98. The phase shifter 98 receives a primary phase reference input from the variable frequency RF source 93. The RF receiver 89 may include quadrature detection capability. The RF receiver 89 provides an output to an analog to digital ("A/D") converter 96. The A/D converter 96 output can be stored in a buffer 97 until required for use by the down-hole computer 92. Alternatively, the buffer 97 contents can be conducted directly to a downhole part of a telemetry unit 99 for transmission to the surface equipment (54 in FIG. 1).

Alternatively, for quadrature two-channel phase-sensitive detection the receiver antenna 70 may be constructed in accordance with FIG. 3. The receiver antenna 70 shown in FIG. 3 comprises a first receiving coil 71 and a second receiving coil 72. These coils 71, 72 are substantially identical to each other in design but are rotated 90° with respect each other about the longitudinal axis 78. NMR in the sensitive volume 58 induces a first signal in the first receiving coil 71 and induces a second signal, which has a 90° phase shift with respect to the first signal, into the second receiving coil 72. Coils 71 and 72 can be electrically connected to the receiver preamplifier 73 by means of the switch in the T/R matching circuit 45. As is understood by those skilled in the art of NMR, quadrature two-channel phase-sensitive detection requires two substantially equal and independent channels in the T/R matching circuit 45, the receiver preamplifier 73, the RF receiver 89, the A/D converter 96 and the buffer 97.

The downhole computer 92 typically preprocesses the data from the buffer 97 and transfers the preprocessed data to the downhole portion of the telemetry system, shown generally at 99. The downhole portion of the telemetry system 99 transmits the preprocessed data to the uphole portion of the telemetry unit (38 in FIG. 1) located in the surface equipment (54 in FIG. 1). The telemetry unit 38 transfers the data to the surface computer (40 in FIG. 1) for calculating and presenting desired well logging output data for further use and analysis as is understood by those skilled in the art.

All of the elements described herein and as shown in FIG. 4, except the transmitter antenna 67, the magnet assembly 60 and the receiver antenna 70, at the convenience of the system designer may be disposed within the housing 43, the top centralizer (56 in FIG. 1) or the NMR electronics cartridge (44 in FIG. 1). These same elements may alternatively be located at the earth's surface, for example in the surface equipment 54 using the cable (30 in FIG. 1) for transmission of electrical power and signals to the transmitter antenna 67 and the receiver antenna 70.

4. Static Magnetic Field and RF Magnetic Field Geometry

Figure 5:
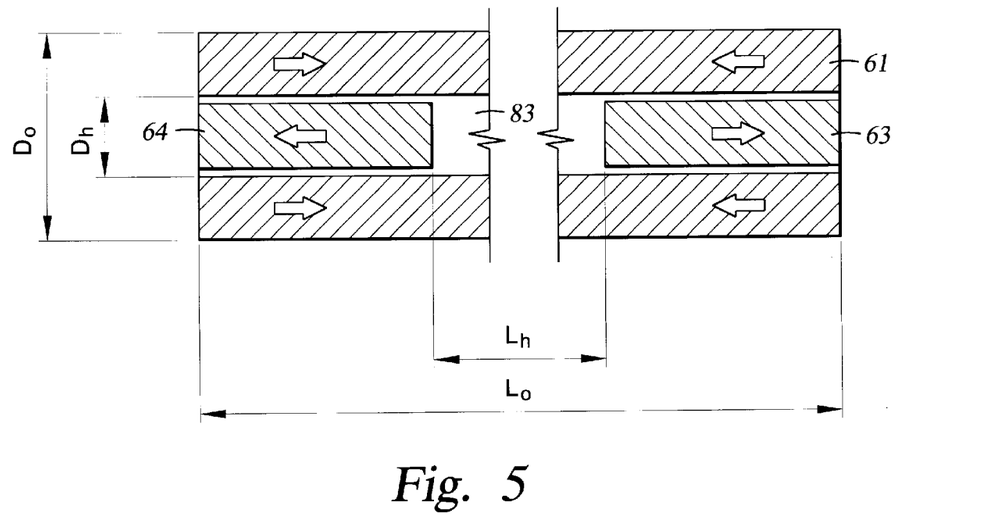
FIG. 5 shows a graphic representation of the static and radio frequency (RF) magnetic field.

FIG. 5 illustrates the static magnetic field and the RF magnetic field created by the NMR well logging apparatus of the present invention. As previously explained, the permanent magnet 62 preferably has substantially uniform magnetization along the longitudinal axis 78. The direction of magnetization (82 in FIG. 2) of the magnet 62 is preferably parallel to the longitudinal axis 78. The direction of the static magnetic field within the sensitive volume 58 induced by the permanent magnet 62, as shown by arrows 110 is substantially parallel to the longitudinal axis 78 and opposite to the direction of magnetization (82 in FIG. 2) of the magnet 62. Nuclear magnetic moments in the material to be analyzed (the earth formation located within the sensitive volume 58) are substantially aligned in the direction of the static magnetic field. In the preferred embodiment of the invention, the direction of a linearly polarized RF magnetic field generated by the transmitter antenna 67, denoted by arrows 120, within the sensitive volume 58 is substantially perpendicular to the static magnetic field at any point within the sensitive volume 58. Such a magnetic field arrangement is conventional for NMR experiments.

The static magnetic field direction is also substantially symmetric about the longitudinal axis 78. The static magnetic field magnitude is, therefore, also substantially symmetric about the longitudinal axis 78. The static magnetic field has an amplitude gradient within the sensitive volume 58 which is also symmetric about the longitudinal axis 78 and is directed substantially radially inwardly towards the longitudinal axis 78. As a result there is generally only one substantially cylindrical surface external to the permanent magnet 62 which has a particular static magnetic field amplitude (ignoring any end effects of the magnet 62). It follows from this particular feature of the static magnetic field that stray resonance signals from diverse materials such as the drilling mud (34 in FIG. 1), which originate outside of the sensitive volume 58 do not substantially affect the NMR measurements if appropriate RF frequencies are selected. Undesired static magnetic field end effects may be substantially eliminated by making the transmitting antenna 67 somewhat shorter along the longitudinal axis 78 than the permanent magnet 62, so as not to excite materials at the extreme longitudinal ends of the static magnetic field.

When RF power pulses are conducted through the transmitter antenna 67, the antenna 67 generates an RF equivalent magnetic dipole 87 centered at the origin and directed perpendicular to the longitudinal axis 78. The equivalent magnetic dipole 87 generates a linearly polarized RF magnetic field 120 of substantially equal amplitude within the sensitive volume 58. Since the RF magnetic field direction is perpendicular to the longitudinal axis 78, the bulk nuclear magnetization, denoted in FIG. 5 by arrows 130, at any point in the sensitive volume 58 rotates in planes parallel to the longitudinal axis 78. The free precession of the nuclear magnetic moments, however, is around the static magnetic field direction at any point within the sensitive volume 58, and the free precession is always in a plane perpendicular to the longitudinal axis 78. The free precession will therefore induce an RF signal in the receiver antenna 70. The induced magnetic moment in the receiver coil 70 is shown in FIG. 5 as an arrow 140.

For generation of a circularly polarized RF magnetic field, the transmitter antenna 67 comprises the previously described first transmitter coil (85 in FIG. 3) and the second transmitter coil (86 in FIG. 3) (not shown separately in FIG. 5). These coils (85, 86 in FIG. 3) as previously explained are substantially identical to each other but are rotated 90° with respect to each other about the longitudinal axis 78. When RF power pulses are conducted through the transmitter antenna 67 via the two orthogonal transmitting coils (85, 86 in FIG. 3), two orthogonal, substantially equal amplitude linearly polarized RF magnetic fields, denoted in FIG. 5 by arrows 120 and 160, are generated within the sensitive volume 58. Since the orthogonal transmitting coils (85, 86 in FIG. 3) are fed by RF currents 90° out of phase with each other, the resulting RF magnetic field within the sensitive volume 58 is a circularly polarized or "rotating" RF field.

Those skilled in the art of nuclear magnetic resonance measurements will readily comprehend that the free precession of the bulk nuclear magnetization about the static magnetic field will also induce an RF signal in the transmitter coil 67, this signal shown in FIG. 5 as arrows 150. The signal induced in the transmitter coil 67 is directionally rotated 90 degrees (orthogonal) with respect to the signal which is induced in the receiver coil 70. The convenience of orthogonal transmitting and receiving, circularly polarized transmitting and inducing of orthogonal NMR signal components by the apparatus of the invention are significant improvements over prior art NMR well logging apparatus.

Because the transmitter coil 67 is substantially orthogonal to the receiver coil 70, during transmission of RF pulses there is substantially zero signal directly induced the receiver coil 70. As a result, the dead time of the whole receiving system may be reduced significantly with respect to prior art NMR apparatus having only a single transceiver antenna.

Orthogonal transmission and reception of the RF signals has an additional advantage when permanent magnets are employed and the system dead time has to be kept as short as possible. Prior art NMR logging tools typically suffer high levels of magnetoacoustic and magnetostrictive ringing. The means by which the apparatus of the invention reduces such ringing will be further explained.

Another particular advantage of the present invention is the presence of a substantially constant static magnetic field amplitude and static field amplitude gradient in the materials to be analyzed within the sensitive volume 58. This feature, and the existence of internal magnetic field gradients within the pore spaces of the materials to be analyzed can be used for direct measurement of the diffusion coefficient of any fluid present in the pore spaces of the material to be analyzed, as explained for example in C. P. Slichter, *Principles of Magnetic Resonance*, Appendix G, Springer Verlag Berlin Heidelberg, New York, 1980. The amplitude gradient of the static magnetic field according to this aspect of the invention is about 4 Gauss/cm within the sensitive volume 58.

The substantially constant gradient of the static magnetic field can also be utilized to perform NMR measurements at a second frequency (adjacent sensitive volume) while the sensitive volume 58 excited at the first frequency is still undergoing nuclear relaxation. Several frequencies may be used to conduct NMR experiments in a number of different radius sensitive volumes.

5. Design Parameters for the Preferred Embodiment

In the preferred embodiment of the invention, the signal-to-noise ratio for the NMR measuring process is sought to be optimized. The following discussion is intended to explain how certain principal parameters affect the signal-to-noise ratio. Reference is now made to FIG. 4. The principal parameters typically affecting the signal-to-noise ratio include the geometry of the permanent magnet 62, the geometry of the transmitter antenna 67, the geometry of the receiver antenna 70, the power of the radio frequency (RF) pulses used to energize the transmitter antenna 67 and the quality factor ("Q") of the receiver antenna 70. For purposes of this discussion it is assumed that the transmitter antenna 67 and the receiver antenna 70 have the same length along the longitudinal axis 78 and the transmitter antenna 67 is rotated 90° around the longitudinal axis 78 with respect to the receiver antenna 70.

Using the transmitter antenna 67 and the receiver antenna 70 constructed as previously described, the magnitude of an NMR signal, S, induced in the receiver antenna 70 is typically related to the magnitude of an RF electromagnetic field, $B_1$, by the Reciprocity Theorem and can be described as in the following expression:

$$S = \omega m A_{SV}(B_1/I_1)l \qquad (1)$$

where m and $A_{SV}$, respectively, represent the nuclear magnetization magnitude and the cross sectional area of the sensitive volume (58 in FIG. 1), $I_1$, represents the magnitude of the current flowing in the transmitter antenna 67, the oscillating frequency of that current is represented by w and l represents the effective lengths of the transmitter antenna 67 and the receiver antenna 70. For simplicity of this discussion, m and $B_1$ are assumed to be substantially homogeneous within the sensitive volume 58.

By substituting $m=\chi B_0/\mu_0$; where $\chi$ represents the nuclear magnetic susceptibility of hydrogen nuclei within the sensitive volume 58, then $\omega=\gamma B_0$, where $B_0$ represents the static magnetic field generated by the permanent magnet 62. It is therefore possible to derive the following expression for S:

$$S=(\gamma\chi/\mu_0)B_0^2(B_1 I_1)A_{SV} l \qquad (2)$$

The NMR signal thus acquired is therefore directly proportional to cross-sectional area of the sensitive volume 58 in the earth formation (26 in FIG. 1). The geometry of the sensitive volume 58 is determined by the existence of a resonance condition. In pulsed NMR experiments, the resonance condition is typically met when the deviation of the static magnetic field magnitude $B_0(R)$ from its average value $B_0(R_{SV})$, corresponding to the central frequency of the current energizing the transmitter antenna 67 ($B_0(R)=\omega/\gamma$), is no greater than about one half the magnitude of the RF magnetic field $B_1$ induced by passing current through the transmitter antenna 67, expressed as shown in equation (3):

$$B_0(R)-B_0(R_{SV}) \leq B_1/2 \qquad (3)$$

The static magnetic field BO(R) at the radius of the sensitive volume 58, $R_{SV}$, may also be described in the form of a Taylor expansion as:

$$B_0(R)=B_0(R_{SV})-(\partial B_0/\partial R)(R-R_{SV}) \qquad (4)$$

where $(\partial B_0/\partial R)$ represents the static magnetic field gradient at radius $R=R_{SV}$. From equation (3):

$$B_0(R_0)-B_0(R_i) \leq B_1 \qquad (5)$$

where $R_0$ and $R_i$ represent, respectively, the outer and inner radii of the sensitive volume 58. As a practical matter $R_0-R_i<<R_{SV}$. Then:

$$A_{SV}=2\pi R_{SV} B_1/(\partial B_0/\partial R) \qquad (6)$$

For a typical two-dimensional transverse dipole antenna as described, for example, in the Taicher et al '713 patent, supra, the ratio $B_1/I_1$ can be described by the following expression:

$$B_1/I_1=\mu_0 n R_a/4R^2 \qquad (7)$$

where $R_a$ represents the transmitter antenna 67 dipole radius, which radius is generally limited by the radius of the wellbore (22 in FIG. 1). Substitution of equations (6) and (7) into equation (2) yields the expression:

$$S=[2\pi B_1\gamma\chi(nR_a/4)][(l/R_{SV})B_0^2/(\partial B_0/\partial R)] \qquad (8)$$

As is understood by those skilled in the art, the root-mean-square (RMS) thermal noise can be described by the expression:

$$N_{rms}=(4kT\Delta fr)^{1/2} \qquad (9)$$

where $\Delta f$ represents the receiver bandwidth. The bandwidth is typically about $\gamma B_1/2\pi$ for a matched receiver; k represents Boltzmann's constant; and T represents the absolute temperature.

Then substituting for equations (8) and (9) yields the following expression for signal-to-noise ratio (S/N):

$$S/N=[\pi B_1\gamma\chi(kT\Delta fr)^{-1/2}(nR_a/4)]\times[(l/R_{SV})B_0^2/(\partial B_0/\partial R)] \qquad (10)$$

The first bracketed expression in equation (10), for a given proton spin density and absolute temperature, depends only on the transmitter antenna 67 and the receiver antenna 70 parameters. The second bracketed expression in equation (10) describes parameters used in the design of the permanent magnet 62, as will be further explained.

As explained above, the free precession of the bulk nuclear magnetization about the static magnetic field will also induce an RF signal in the transmitter antenna 67. The signal induced in the transmitter antenna 67 is directionally rotated 90 degrees (orthogonal) with respect to the signal which is induced in the receiver antenna 70 and has about the same signal-to-noise ratio. When both signals are properly added, signal-to-noise ratio may be improved by a factor of $\sqrt{2}$.

6. Features of the Static Magnetic Field

Figure 6:
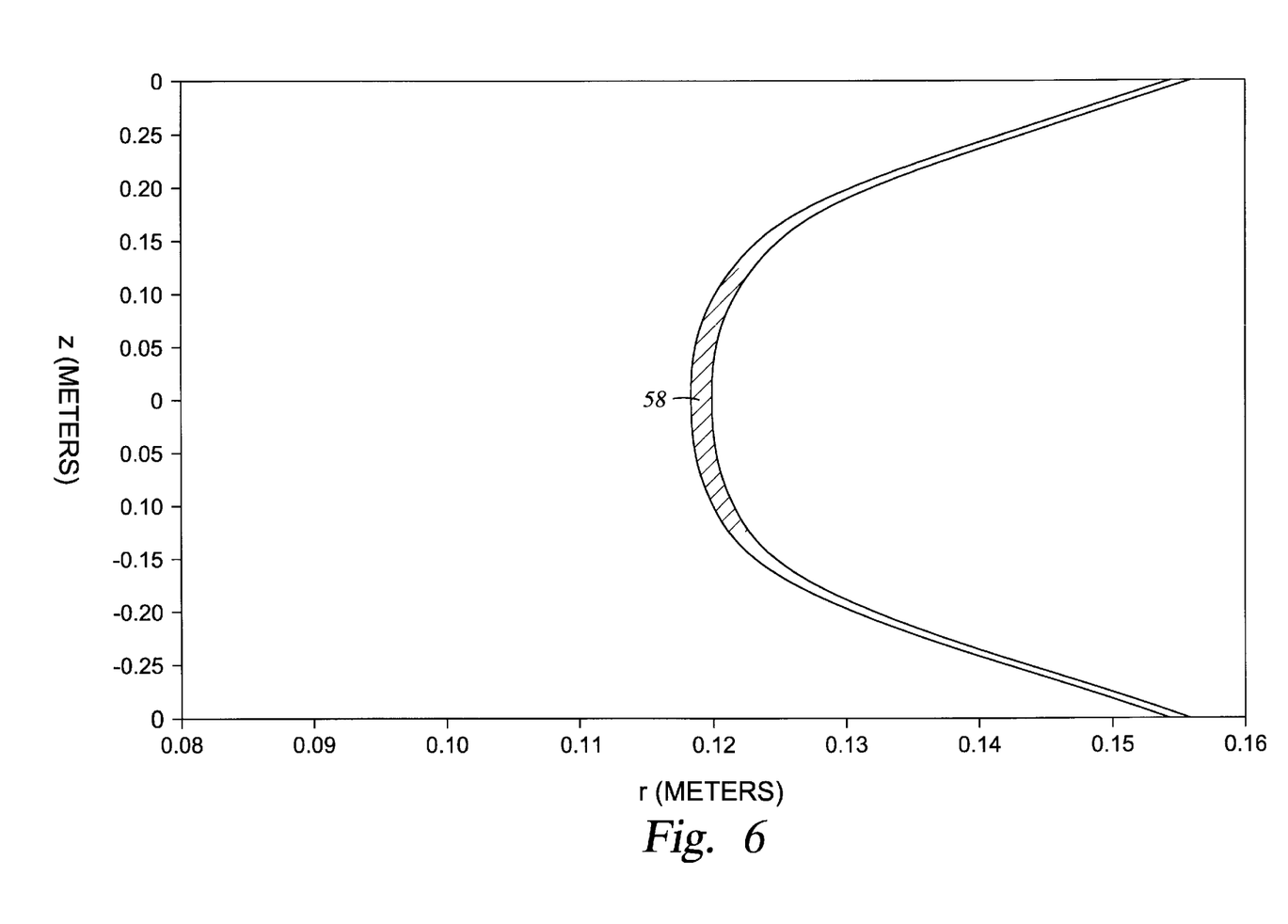
FIG. 6 shows a graph of the static magnetic field induced by the magnet in the sensitive volume.

To keep the length of the magnet (62 in FIG. 2) as short as is practical, it is important that the magnet 62 induce a static magnetic field having a homogeneity length exceeding the antenna aperture length l, and also to ensure a steady state magnetization within the sensitive volume 58 even while the NMR probe 42 is moving through the wellbore (22 in FIG. 1). It follows from equation (10) that the optimal antenna aperture length l and the radius $R_{SV}$, of the sensitive volume 58 are generally determined by the vertical resolution and measurement investigative depth requirements of the well logging instrument. In so designing the instrument, the ratio $B_0^2/(\partial B_0/\partial R)$ should be maximized to provide the best overall signal-to-noise ratio. FIG. 6 shows a graph of a static magnetic field 110 which has a field strength of about $3.3\times10^{-3}$ T within the sensitive volume 58. FIG. 6 shows a graph of the static magnetic field induced in the sensitive volume 58 but in more detail. The field strength of $3.3\times10^{-3}$ T corresponds to an NMR operating frequency of about 0.15 MHz.

Figure 7:
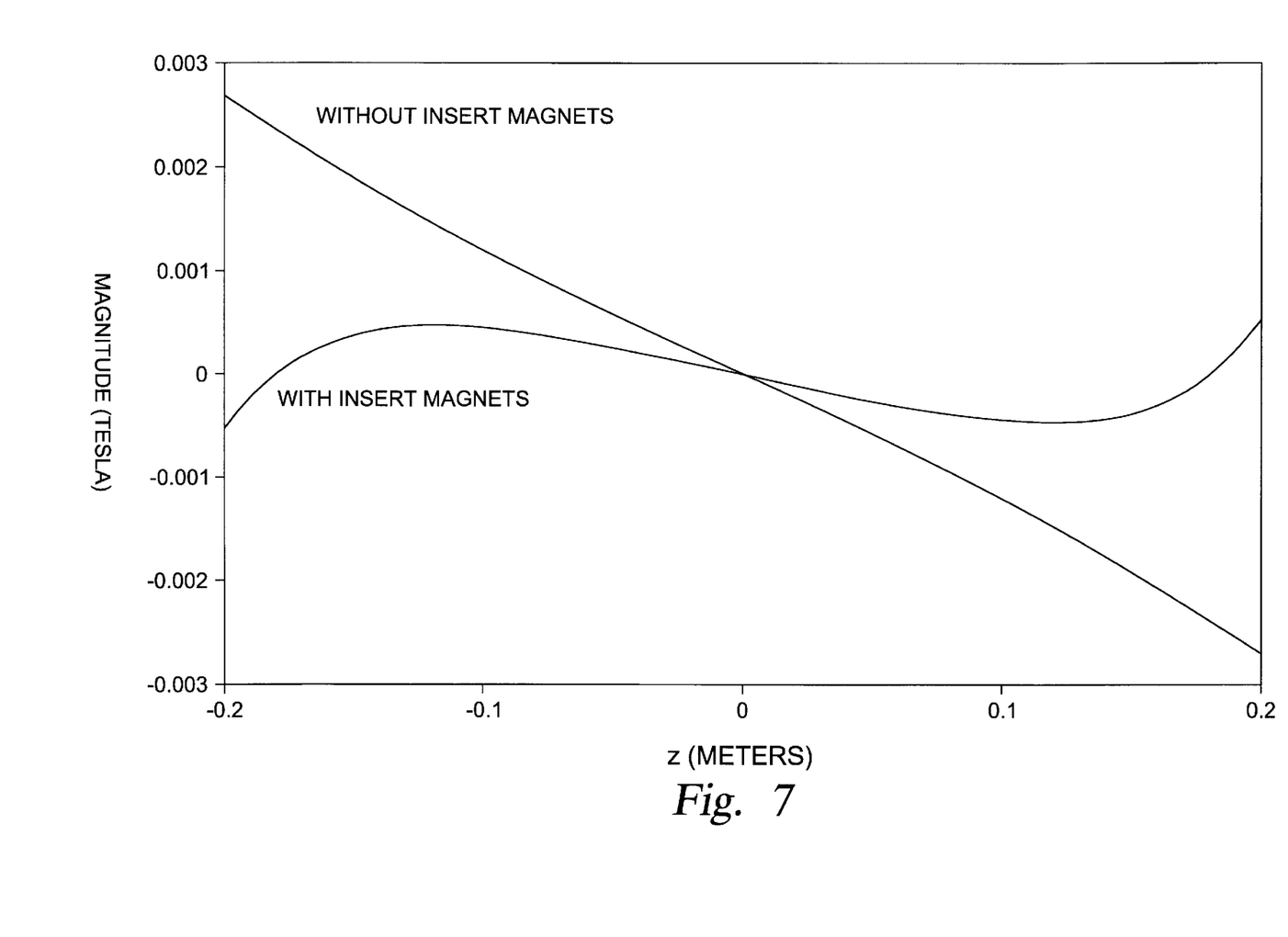
FIG. 7 shows a detailed drawing of the magnet.
Figure 8:
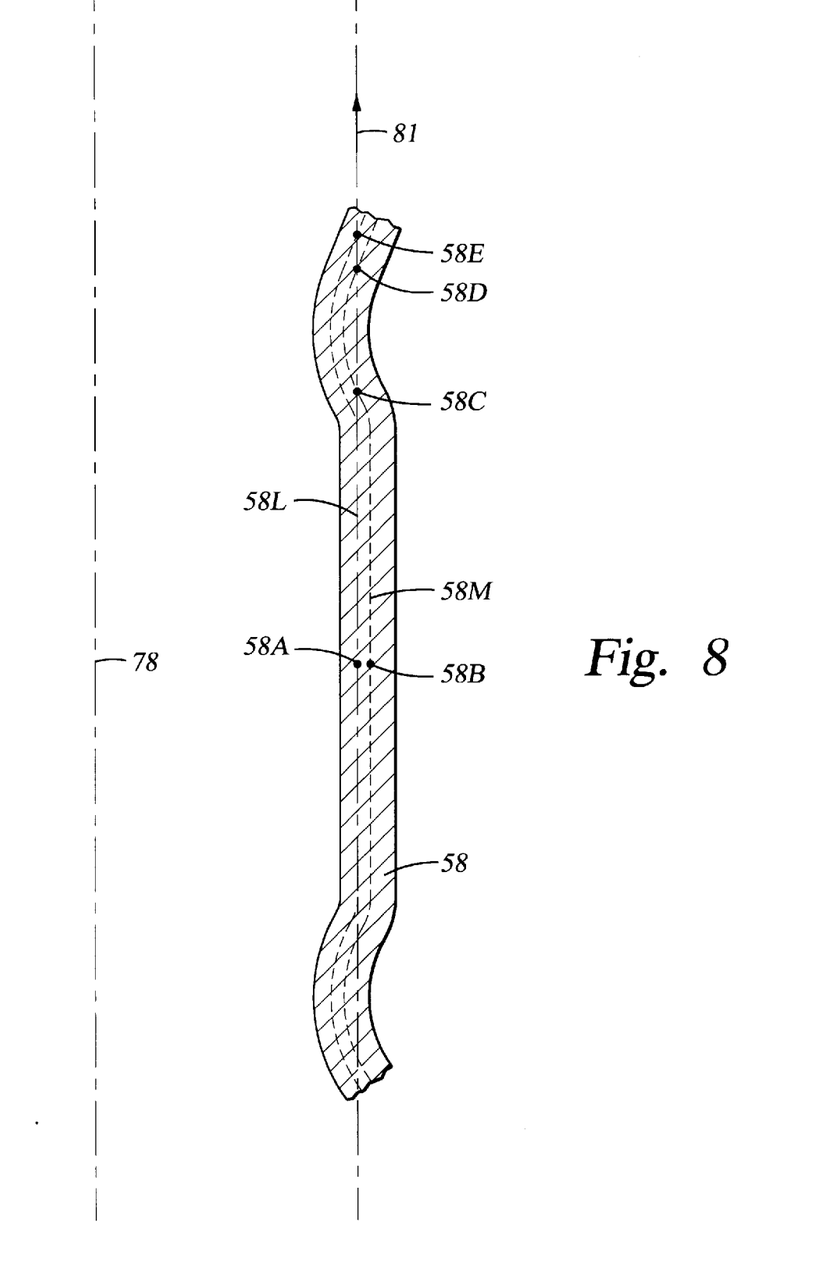
FIG. 8 shows a graph of the static magnetic field induced by the magnet in the sensitive volume from FIG. 6 in more details.

FIG. 7 shows a practical geometry of the permanent magnet (62 in FIG. 2) which will produce a static magnetic field having the required characteristics for use with the invention. The dimensions shown for the magnet in FIG. 7 are as follows: $L_0=1$ m; $L_1=0.4$ m; $L_2=0.17$ m; $D_0=0.062$ m; $D_1=0.066$ m; $D_2=0.07$ m. The magnet 62 shown in FIG. 7 is particularly suitable for a 40 cm length transmitter antenna and a 24 cm diameter sensitive volume (58 in FIG. 1). These and other operational parameters are a matter of convenience for the system designer and are not to be construed as a limitation on the invention. The static magnetic field distributions shown in FIG. 6 is calculated for a magnet material having a remanence magnetization, Br, equal to 0.7 T.

As previously explained, another parameter affecting the design of the permanent magnet (62 in FIG. 2) is the degree of homogeneity of the static magnetic field in the direction of movement (81 in FIG. 3) of the apparatus along the longitudinal axis (78 in FIG. 2) of the magnet (62 in FIG. 2) relative to the sensitive volume 58. The following discussion is provided to explain a limitation on the magnitude of the static magnetic field gradient along the direction of movement (81 in FIG. 3) and laterally about the longitudinal axis (78 in FIG. 2).

The sensitive volume 58 is determined by the RF magnetic field. To obtain undistorted NMR signals, any point within the sensitive volume should not leave the sensitive volume during the time span of a measurement sequence (a full CPMG echo train). If tool motion is such that any point may leave the sensitive volume during a measurement sequence, later 180° pulses in the CPMG echo train may be applied to parts of the earth formation which had not previously been transversely polarized by the initial 90° pulse. The distance, $\Delta s$, along a direction of motion from a point, N, inside the sensitive volume 58 to the boundary of the sensitive volume 58 can be estimated by the expression:

$$\Delta s(N) = [B_0(n) - B_0(B)]/G \qquad (11)$$

where $B_0(N)$ represents the static magnetic field amplitude at point N inside the sensitive volume 58, $B_0(B)$ represents the static magnetic field amplitude at the boundary of the sensitive volume 58 and G represents the static magnetic field gradient in the direction of motion. The total movement, or displacement during a time interval, t, of the well logging instrument should be less than $\Delta S(N)$. More specifically:

$$v \times t < \Delta s(N) \qquad (12)$$

where v represents the speed of motion of the well logging instrument. The total displacement of the instrument should not represent a substantial portion of the total volume. The inequality which should thus be satisfied can be written as:

$$[B_0(N) - B_0(B)] - \ll B_1 \qquad (13)$$

A reasonable estimate of the maximum gradient in the direction of motion can be calculated as:

$$G < (0.1 B_1)/(v \times t) \qquad (14)$$

For practical values of $B_1$ in the range of $2 \times 10^{-4}$ T, and v of about 0.05 m/sec, for a time of 200 milliseconds for a measurement sequence G should be less than about $2 \times 10^{-3}$ T/m (equivalent to about 0.2 Gauss/cm). This value was used as a constraint in the procedure for optimizing the shape of the static magnetic field.

Random movement of a well logging instrument also occurs in a direction perpendicular to the longitudinal axis (78 in FIG. 2). For purposes of optimizing the shape of the static magnetic field, it was assumed that this motion had a velocity about 50 times smaller than the logging speed. This requires the static magnetic field gradient in the direction perpendicular to the longitudinal axis (78 in FIG. 2) to be less than about 0.1 T/m. The preferred geometry of the magnet (62 as shown in FIG. 7) provides a radial static magnetic field gradient of about 0.04 T/m.

Other values of for the value of the radial gradient, of course, may be selected by changing the operating frequency for the RF pulses applied to the transmitting antenna (67 in FIG. 2), thereby changing the radius of the sensitive volume (58 in FIG. 1) and the associated static field amplitude and gradient.

The requirements for the radial static magnetic field gradient are also affected by the presence of the earth's magnetic field, $H_e$, which may vary in value and direction with respect to the geographical location at which the apparatus is used. The earth's magnetic field is substantially homogeneous and is about $0.5 \times 10^{-4}$ T/m in magnitude. The logging tool orientation with respect to the earth's magnetic field direction will depend on, among other things, the geographical location and drilling deviation from vertical of the wellbore (22 in FIG. 1). Changes in orientation of the logging instrument with respect to the earth's magnetic field should not materially affect the radius of the sensitive volume, $R_{SV}$, by changing the distribution of the static magnetic field. Changes in the sensitive volume radius, $R_{SV}$, which result from the earth's magnetic field can be expressed by the ration $H_e/G$. A minimum requirement for the value of the gradient in the static magnetic field can be met when the inequality:

$$H_e/G \ll R_{SV} \qquad (15)$$

is satisfied. For a sensitive volume radius, $R_{SV}$ of about 0.1 m, the static field gradient, G, should be much greater than about $5 \times 10^{-4}$ T/m. As a practical matter, the static magnetic field induced by the magnet in this invention includes a gradient more than about $2 \times 10^{-2}$ T/m in the sensitive volume and so meets the foregoing requirement. These and other operational parameters and requirements are a function of the required specifications of the NMR well logging instrument such as logging speed, depth of investigation, vertical resolution, signal-to-noise ratio. Therefore, the specific embodiment and apparatus parameters disclosed herein are a matter of convenience for the system designer and are not to be construed as a limitation on the invention.

It will be readily appreciated by persons skilled in the art that the invention is not limited to what has been particularly shown and described herein. Rather the scope of the present invention should be limited only by the claims which follow.

What is claimed is:

1. A nuclear magnetic resonance sensing apparatus, comprising:
    a magnet for inducing a substantially homogeneous static magnetic field within an annular cylinder in materials to be analyzed, said cylinder substantially coaxial with a longitudinal axis of said apparatus, said magnetic field polarized substantially parallel to said longitudinal axis, said magnetic field having a maximum longitudinal gradient within said cylinder inversely related to a speed of motion of said apparatus along said longitudinal axis through said materials to be analyzed;
    a transmitter for generating a radio frequency magnetic field in said materials for exciting nuclei therein, said radio frequency magnetic field substantially orthogonal to said homogeneous magnetic field within said annular cylinder; and
    a receiver for detecting nuclear magnetic resonance signals from said excited nuclei in said materials.

2. The apparatus as defined in claim 1 wherein said longitudinal gradient is less than about $2 \times 10^{-3}$ T/m corresponding to a speed of motion of about 10 feet per minute.

3. The apparatus as defined in claim 1 wherein said homogeneous magnetic field comprises a radial gradient inversely proportional to an expected velocity of radial movement of said apparatus through said materials.

4. The apparatus as defined in claim 3 wherein said radial gradient is less than about 0.1 T/m.

5. The apparatus as defined in claim 4 wherein said radial gradient is more than about $2 \times 10^{-2}$ T/m to minimize effects of the earth's magnetic field on measurements made by said apparatus.

6. The apparatus as defined in claim 1 wherein said transmitter comprises two mutually orthogonal antennas each energized by radio frequency power having a 90 degree phase difference from radio frequency power energizing the other one of said mutually orthogonal antennas, whereby a circularly polarized RF magnetic field is generated by said transmitter.

7. The apparatus as defined in claim 6 wherein said receiver comprises two mutually orthogonal antennas coupled to circuits for performing quadrature phase sensitive detection of said nuclear magnetic resonance signals.

8. The apparatus as defined in claim 1 wherein said transmitter comprises an antenna having a longitudinal aperture shorter than a length within said materials of said annular cylinder along said direction of motion of said apparatus, whereby nuclei are excited by said radio frequency magnetic field where said nuclei are substantially in equilibrium with said homogeneous static magnetic field.

9. The apparatus as defined in claim 8 wherein said receiver comprises an antenna having a longitudinal aperture shorter than said longitudinal aperture of said transmitter antenna in said direction of motion, whereby said nuclear magnetic resonance signals are received from substantially fully radio frequency excited nuclei.

10. A method for measuring nuclear magnetic resonance properties of earth formations penetrated by a wellbore, comprising:

polarizing nuclei in said earth formations along a static magnetic field substantially parallel to said wellbore within an annular cylinder, said static magnetic field having an amplitude gradient parallel to said wellbore inversely proportional to a speed of motion of said static magnetic field along said wellbore, said speed of motion corresponding to a logging speed of a well logging instrument disposed in said wellbore;

transversely polarizing said nuclei by applying a radio frequency magnetic field substantially orthogonal to said static magnetic field; and receiving nuclear magnetic resonance signals from said transversely polarized nuclei.

11. The method as defined in claim 10 wherein said gradient parallel to said wellbore is less than about $2 \times 10^{-3}$ T/m within said cylinder for a speed of motion of about 10 feet per minute.

12. The method as defined in claim 10 wherein said static magnetic field has a radial amplitude gradient inversely proportional to an expected speed of radial motion of said logging instrument.

13. The method as defined in claim 12 wherein said radial gradient is less than about 0.1 T/m within said cylinder.

14. The method as defined in claim 9 wherein said radial gradient is more than about $2 \times 10^{-2}$ T/m to minimize effects of the earth's magnetic field on measurements of said nuclear magnetic resonance properties.

15. The method as defined in claim 10 wherein said step of transversely polarizing comprises applying two substantially orthogonal radio frequency magnetic fields having a 90 degree phase difference between them.

16. The method as defined in claim 10 wherein said step of receiving comprises quadrature phase sensitive detection of radio frequency magnetic fields in two orthogonal directions.

* * * * *